Sept. 1, 1970   W. O. JONES, JR   3,526,835
APPARATUS FOR AND METHOD OF TESTING AND THEREAFTER SIMULTANEOUSLY
TESTING AND BLOCKING STRIP CONDUCTOR COILS
Filed Aug. 5, 1968   5 Sheets-Sheet 1

INVENTOR
WILLIAM OLIN JONES, JR.
BY Glenn Palmer & Lyne
HIS ATTORNEYS

INVENTOR
WILLIAM OLIN JONES, JR.

BY *Glenn Palmer & Lyne*

HIS ATTORNEYS

United States Patent Office 3,526,835
Patented Sept. 1, 1970

3,526,835
APPARATUS FOR AND METHOD OF TESTING AND THEREAFTER SIMULTANEOUSLY TESTING AND BLOCKING STRIP CONDUCTOR COILS
William Olin Jones, Jr., Richmond, Va., assignor to Reynolds Metals Company, Richmond, Va., a corporation of Delaware
Filed Aug. 5, 1968, Ser. No. 750,179
Int. Cl. G01r 31/02
U.S. Cl. 324—158        21 Claims

ABSTRACT OF THE DISCLOSURE

An apparatus for and method of testing and blocking electrical coils wherein a coil is supported on a test fixture which is provided with locking means and such locking means is automatically controlled by an associated electrical system. The electrical system automatically and sequentially tests and blocks a particular coil and controls the action of the locking means so as to require separate and external actuation of the system to release a defective coil whereby the testing and blocking cycle may be started again upon placing another coil on the test fixture.

CROSS REFERENCE TO RELATED APPLICATION

This application is related to application Ser. No. 750,083, filed concurrently herewith.

BACKGROUND OF THE INVENTION

In the manufacture of an electrical strip conductor coil, i.e., an electrical coil made from an elongated strip of electrically conductive material which is wound in coil form with an electrical insulating material between each pair of immediately adjacent turns, it is necessary that such coil be electrically tested to assure that it has the desired number of turns, coil resistance, etc. It is often desirable that a strip conductor coil be "blocked," i.e., treated so that immediately adjacent turns of the coil are bonded together so that the entire coil is, in effect, a substantially unitary construction.

SUMMARY

This invention provides an improved apparatus for and method of testing and blocking a strip conductor coil wherein an electrical system is used to automatically and sequentially test and block an electrical coil and wherein provisions are made in such apparatus and method to assure that the presence of a defective coil is positively determined and requires that separate and independent action be taken to actuate such electrical system and enable release of such a defective coil from an associated fixture on which it is supported, whereby this invention provides maximum efficiency and operator safety.

Other details, uses, and advantages of this invention will become apparent as the following description of the embodiment thereof presented in the accompanying drawings proceeds.

BRIEF DESCRIPTION OF THE DRAWINGS

The accompanying drawings show a present preferred embodiment of this invention, in which.

DESCRIPTION OF ILLUSTRATED EMBODIMENTS

Figure 1:
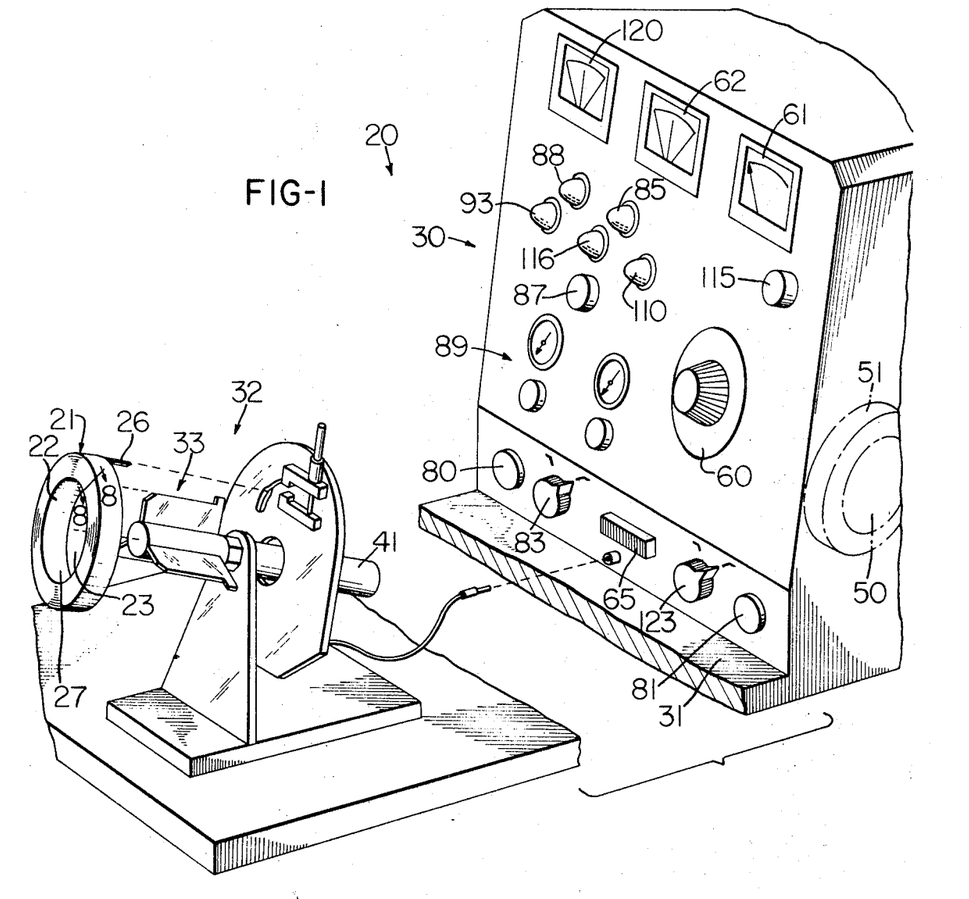
FIG. 1 is an exploded perspective view with parts broken away of an exemplary embodiment of the apparatus and method of this invention and particularly illustrating a test fixture used to support a coil during testing and blocking and an associated electrical console which contains electrical components comprising the apparatus of this invention.

Reference is now made of FIG. 1 of the drawings wherein an exemplary apparatus and method of this invention designated generally by the reference numeral 20 is illustrated and which is adapted to enable rapid electrical testing and blocking of an exemplary electrical strip conductor coil 21 in a substantially automatic and sequential manner.

The apparatus and method of this invention assure that each given coil is tested and blocked in an efficient manner with maximum operator safety. Further, once a coil is found to be defective, separate and independent action is required to remove the coil being testing from its associated apparatus.

The exemplary coil 21 has a substantially right circular cylindrical peripheral outline and a tubular surface 22 defining a central opening 23 extending therethrough. The coil 21 is made from an elongated strip 24 of an electrically conductive material which is wound in coil form and with an electrical insulating material or strip 25 arranged between each pair of immediately adjacent turns, see FIG. 8. The insulating material may be of a type which is bonded or sealed to adjoining surfaces upon being suitably heated to thereby block the coil 21 and in a manner to be described in detail subsequently.

The elongated strip of electrically conductive material 24 used to make coil 21 may have a suitable coating of electrical insulating material such as a coating 25 of a suitable epoxy resin, for example, applied against one surface thereof. The elongated strip 24 may also be wound in unison with a suitable elongated separate strip 25 of electrical insulating material interleaved between adjoining turns in a known manner.

The coil 21 illustrated in FIG. 1 of the drawings has an outer electrical lead 26 fixed to the terminal end portion of its outer turn and an electrically conductive metal core 27 which, in effect, defines the inner lead of the coil 21. The inside surface of the metal core 27 defines the tubular surface 22. However, it will be appreciated that the apparatus and method of this invention is fully applicable to the testing and blocking of a strip conductor coil similar to coil 21 which has a central core which is made of an electrical insulating material and which has a plurality of electrical leads extending outwardly therefrom. For example, a separate inner lead may be provided adjacent the inner tubular core made of an electrical insulating material and such inner lead may be suitably connected to an associated turn of the coil in a similar manner as the outer lead.

The apparatus 20 comprises an electrical console 30 which has a base 31 which is adapted to support a coil holding or supporting fixture 32 and the fixture 32 may be fastened to base 31 in a suitable manner.

The fixture 32 may be of any suitable construction and one exemplary embodiment of a unique fixture which may be used for testing and blocking coils 21 is presented in detail in the patent application referred to at the beginning of this specification. The fixture 32 has a radially expandable mandrel designated generally by the reference numeral 33 which is adapted to be extended within the opening 23 of the coil 21 to firmly grip and hold the coil 21 in position on the fixture 32. The fixture 32 has locking means which is adapted to lock each coil 21 in position on the test fixture 32 and in a manner as will be described in detail subsequently in this specification.

Figure 2:
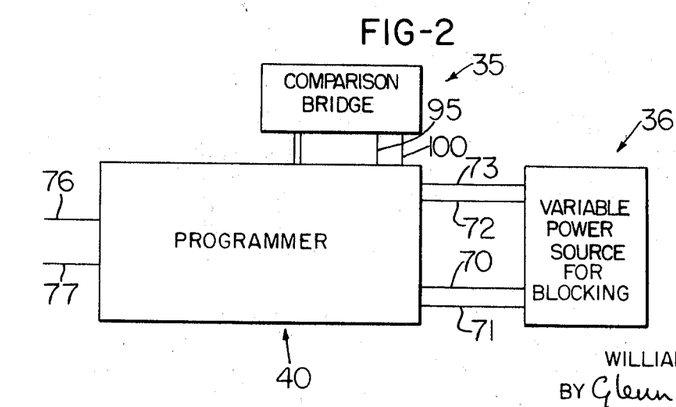
FIG. 2 is a block diagram of the main electrical components of the apparatus of this invention which may be housed in the console of FIG. 1.

The apparatus 20 comprises an efficient electrical system and the major components of such systems are housed in the console 30 and are shown in block diagram in FIG. 2. The major electrical components of the apparatus 20 include an electrical device 35 for initially testing the acceptability of each coil 21 placed in the testing and blocking position on the test fixture 32, an apparatus 36 for varying the electrical power supplied to apparatus 20, and an electrical programmer 40. The electrical programmer 40, electrical device 35, electrical apparatus 36, and the locking means of the test fixture 32 are suitably interconnected and the programmer controls the action of the other components of the system in a simple and reliable manner. In particular, the programmer initially actuates the locking means to lock the coil 21 in position and then automatically and sequentially operatively connects the coil 20 to the electrical device 35 to provide an initial or first test of such coil. The programmer 30 then automatically passes a predetermined high electric current through the initially acceptable coil to resistance heat and block such coil. Substantially simultaneous with the blocking action the programmer 40 provides what is in essence a second test of the acceptable coil to assure the blocked coil is within acceptable limits.

Upon successfully blocking a coil 21, the programmer 40 then automatically releases the locking means comprising the fixture 32 to enable removal of the successfully blocked coil. In the event a defective coil is found by at least one of the tests, i.e., either the initial testing or the simultaneous testing during the blocking action, the programmer holds the locking means in a locked position and requires separate external actuation of such programmer to release such locking means and enable removal of the defective coil. This initial presentation has been made to enable a ready understanding of the overall apparatus of this invention and a detailed presentation of the various component parts will now be made.

Figure 3:
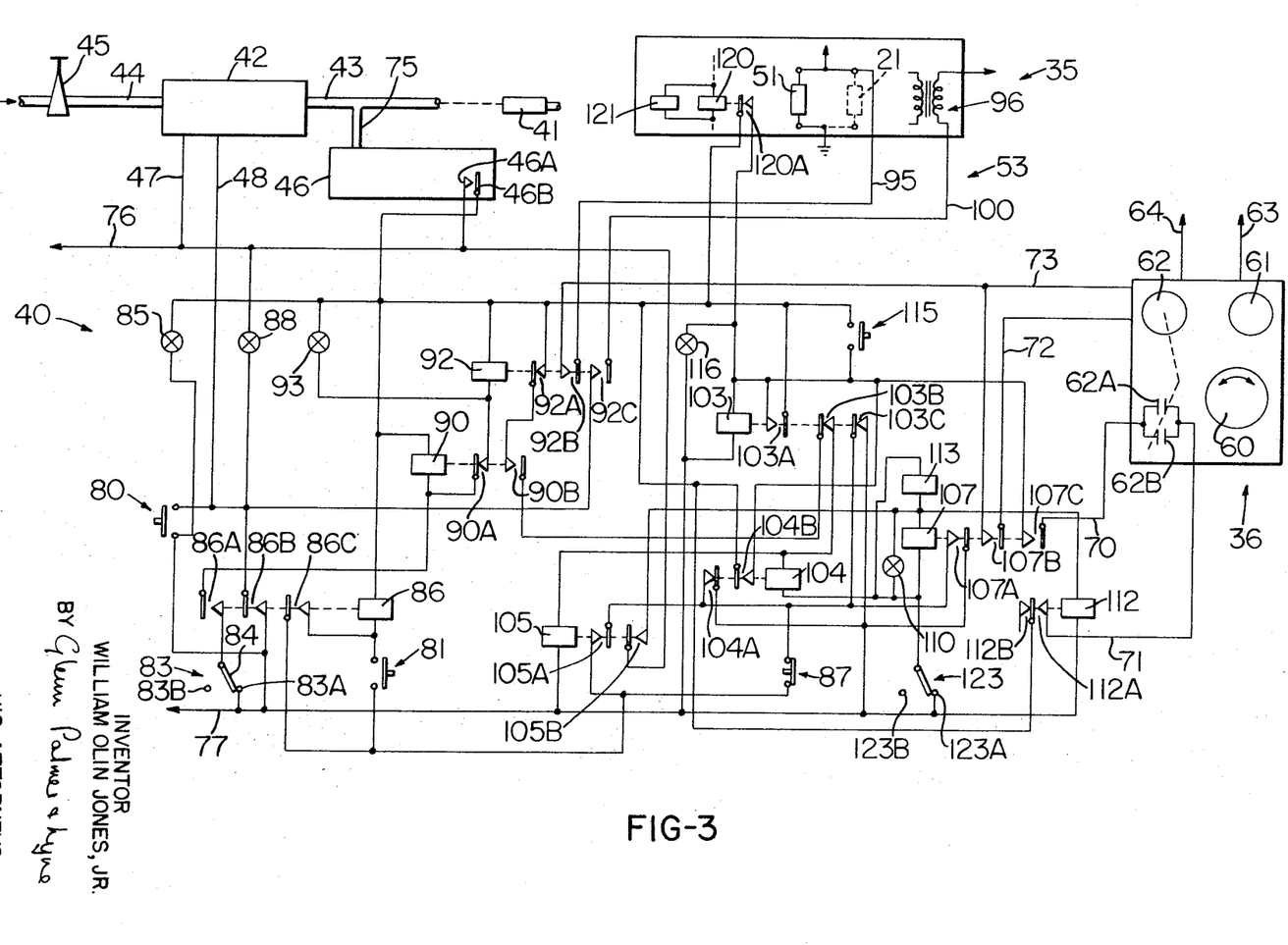
FIG. 3 illustrates an exemplary electrical system comprising the apparatus of this invention and shows a programmer and the manner in which such programmer is interconnected to a coil being tested, an electrical device for initially testing the characteristics of the coil, locking means for locking the coil on its associated test fixture, and a variable power source.

The locking means of this example of the invention comprises a pneumatic actuator or air cylinder 41 provided on the test fixture 32. The air cylinder 41 is operatively connected to the radially expandable mandrel 33 which expands to lock the coil 21 in position. The locking means also comprises an air solenoid valve 42 which has its downstream end connected in flow communication with the actuator 41 by a conduit 43 and the inlet of the air solenoid valve 42 is connected to a conduit 44 which is in turn connected to a suitable source of air under pressure. An adjustable pressure regulator 45 may also be connected in the conduit 44 to control the air pressure supplied to the solenoid valve 42 and hence to the pneumatic actuator 41. The solenoid valve 42 is operatively connected to the programmer 40 by a pair of electrical lines 47 and 48.

The radially expandable mandrel 33, actuator 41, and air solenoid valve 42 comprise the locking means for the exemplary fixture 32 presented in connection with this invention. However, it is to be understood that the fixture used to hold a coil 21 for testing and blocking may be of any suitable construction and provided with locking means either as an integral part thereof or as separate locking means associating with such a fixture and still be completely acceptable for operative association with the other components of the apparatus of this invention.

An air operated switch 46 is also provided and connected to the programmer 40. The switch 46 is provided as a safety feature and deactivates the programmer 40 in the event the air pressure to the actuator 41 is not sufficient to lock the coil 21 in position. The operation of the switch 46 will be described in more detail subsequently.

The apparatus 20 may have a secondary mandrel or other suitable support 50 which may be utilized to support a standard article such as a standard coil 51 of known electrical characteristics and for a purpose which will be apparent later in this specification. The mandrel 50 and associated standard coil 51 are shown by dotted lines in FIG. 1 of the drawings.

The electrical device 35 may be in the form of any suitable electrical device which measures various electrical characteristics of a particular coil 21 to be tested and then blocked; however, in this example of the invention the electrical device 35 is shown as an electrical comparator in the form of an impedance bridge. The impedance bridge 35 is suitably interconnected to the programmer 40 as seen at 53, see FIG. 3, and with the coil 21 and standard coil 51 electrically connected in the bridge 35 in the manner shown.

The impedance of an electrical coil is dependent upon the number of turns, the effective iron mass inside the coil, the width and thickness of the elongated strip 24 and the conductivity of the metal used to make such elongated strip. Generally, the number of turns in a particular coil 21 is controlled by the winding apparatus used to wind such coil. The effective iron mass of the particular coil 21 being tested and the standard coil 51 is generally considered as being substantially equal for practical reasons obvious to those skilled in the art, whereby the conductivity of the elongated strip is the remaining significant variable for each production coil 21 the value of which is to be determined by the impedance bridge 35. The manner in which this conductivity is determined will be presented in more detail subsequently in this specification. In general, it should be mentioned that the difference in electrical impedance of a given coil 21 being initially tested from a standard coil 51 is fed to the programmer 40 and the programmer then either automatically continues the blocking of such given coil 21 or automatically stops the operation and holds such coil locked in position so as to require separate and independent actuation of the programmer 40 to release the coil 21.

Figures 6, 7, 8:
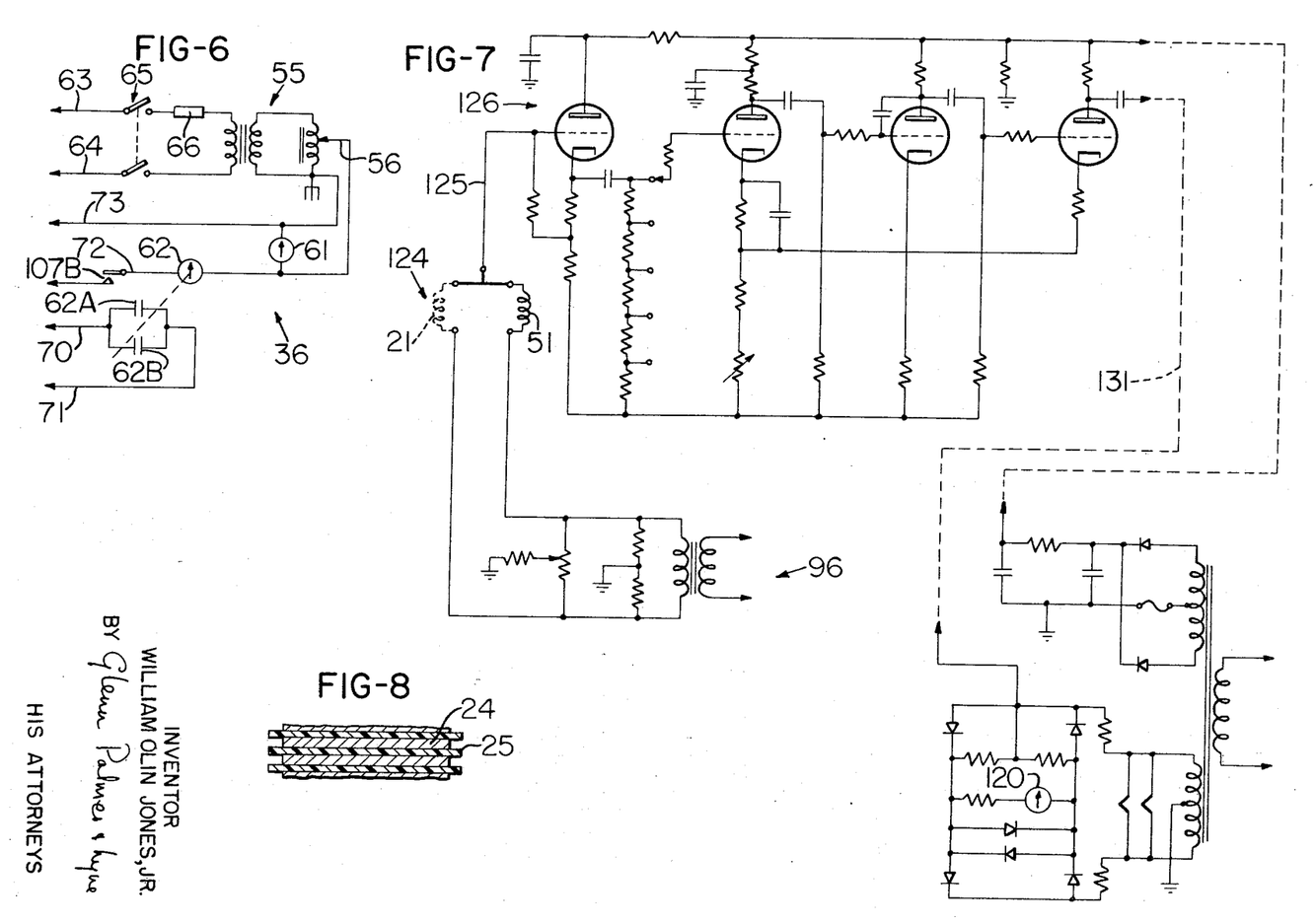
FIG. 6 is a more detailed presentation of a variable power source for the electrical system, and which is shown schematically in the right hand portion of FIGS. 3–5.
FIG. 7 is a detailed diagram of an electrical circuit for an exemplary comparison bridge comprising the apparatus of this invention and used to compare a coil being tested with a standard coil.
FIG. 8 is an enlarged fragmentary sectional view taken on the line 8—8 of FIG. 1 showing typical electrical insulating layers each arranged between an associated pair of immediately adjacent turns of a coil prior to blocking thereof.

The apparatus 36 utilized to vary the power source to the overall apparatus 20 of this invention is illustrated in more detail in FIG. 6 of the drawings and comprises a variable transformer 55 which has an adjustable tap or connector 56 which may be adjustably positioned by a control knob 60 provided on the console 30, see FIG. 1, so as to control the voltage and current used for blocking purposes. A voltmeter 61 and ammeter 62 are electrically connected in the circuit as shown and are mounted on the console 30.

The apparatus 36 for varying power in this example of the invention may be operatively connected to a source of 440 volts 60 cycle AC power, through a pair of lines 63 and 64, and transformer 55 is electrically connected to the lines 63 and 64 with a main on-off switch 65 and a protective fuse 66 being provided in the circuit. The voltage from the variable transformer 55 in one exemplary embodiment of this invention was capable of being varied from 0 to 280 volts AC with a maximum current of 28 amperes being provided.

The ammeter 62 has two sets of adjustable setting contacts shown as contacts 62A which may be set at a comparatively low value and contacts 62B which may be set at a comparatively high value. The ammeter 62, with its contacts 62A and 62B, is operatively connected to the programmer 40 through lines 70 and 71.

The ammeter 62, illustrated in FIGS. 3 and 6, is also connected to the programmer 40 through a line 72 whereby the ammeter 62 is operatively connected through the programmer 40 to the outer terminal of the coil 21. A line 73 is also provided and connected to the metal core 27, which defines the inner terminal, of the coil 21 by being first connected through an associated relay contact in the programmer 40.

The programmer 40 also has a manually actuated switch 81 which must be pressed simultaneously with the switch 80 to start the programmer. Because the switches 80 and 81 must be pressed simultaneously, an operator's hands are always moved to a safe location and thereby assure that the apparatus 20 will be operated with maximum safety.

The programmer 40 has substantially all of the control functions and safety interlocks of the electrical system incorporated therein. The operation of the system in such that current can only be applied to the coil 21 when there is sufficient air pressure to actuate the pneumatic actuator 41 in the holding fixture 32 and thereby firmly lock the coil 21 in position. This safety feature, requiring that adequate air pressure be provided, is achieved through the use of the previously mentioned air operated switch 46 which is connected downstream of the air solenoid valve 42 and upstream of the actuator 41 by an air conduit 75.

The switch 46 has normally open contacts defined by a movable contact 46A which is connected to a main power supply line 76 to the programmer 40 and a fixed contact 46B which is connected to the other power supply line 77 through the action of both switches 80 and 81 in the programmer 40. Upon energizing the switches 80 and 81, if sufficient air pressure is not present in the line 75 (and hence to the actuator 41) to actuate the movable contact 46A closed, the programmer 40 cannot be started and this condition is readily detected, as will be apparent from the description to be made subsequently.

A switch 83 is provided in the system and has an arm 84 which is movable between a fixed contact 83A provided for normal operation and an alternate fixed contact 83B. The air system is initially checked by moving the movable arm 84 of switch 83 against the alternate contact 83B which is used for operation of the air circuit only and does not allow continued operation of the programmer 40. With the movable arm 84 moved to the alternate position against contact 83B and upon actuating switches 80 and 81, air under controlled pressure flows through the air solenoid valve 42 to the switch 46 and actuator 41. If there is sufficient air pressure in the system contact 46A of switch 46 is actuated closed whereby electrical power is provided to light a lamp 85 and thereby signal to an operator that the testing and blocking of a coil 21 may continue in a normal manner.

If air pressure in the system is not at an acceptable level the lamp 85 will not be lit; however, if a lamp 88 provided in the circuit is lit, it will indicate electrical power is being supplied to the programmer 40 but such power will not be effective in energizing the programmer until necessary adjustments are made in the air circuit. The air pressure adjustments are easily made through the use of suitable adjustable controls and associated indicating dials which are provided on the console 30 as indicated at 89 and suitably operatively connected in the system in any desired known manner. The testing of the air circuit may be achieved with or without a coil 21 on the fixture 32.

To make adjustments in the air system it is necessary for an operator to actuate both control buttons or switches 80 and 81 simultaneously and with arm 84 of switch 83 against the alternate contact 83B. If the air pressure is at an acceptable level, the lamp 85 is lit as previously described and a relay 86 is also energized. The relay 86 has normally open contacts 86A, 86B, and 86C and once the relay is energized such contacts are closed. Contact 86B is in parallel with switch 80 and contact 86C is in parallel with switch 81. Contact 86C completes what amounts to a holding circuit to keep relay 86 energized. The relay 86 will be held in until power is removed as by pressing a switch 87.

Figure 4:
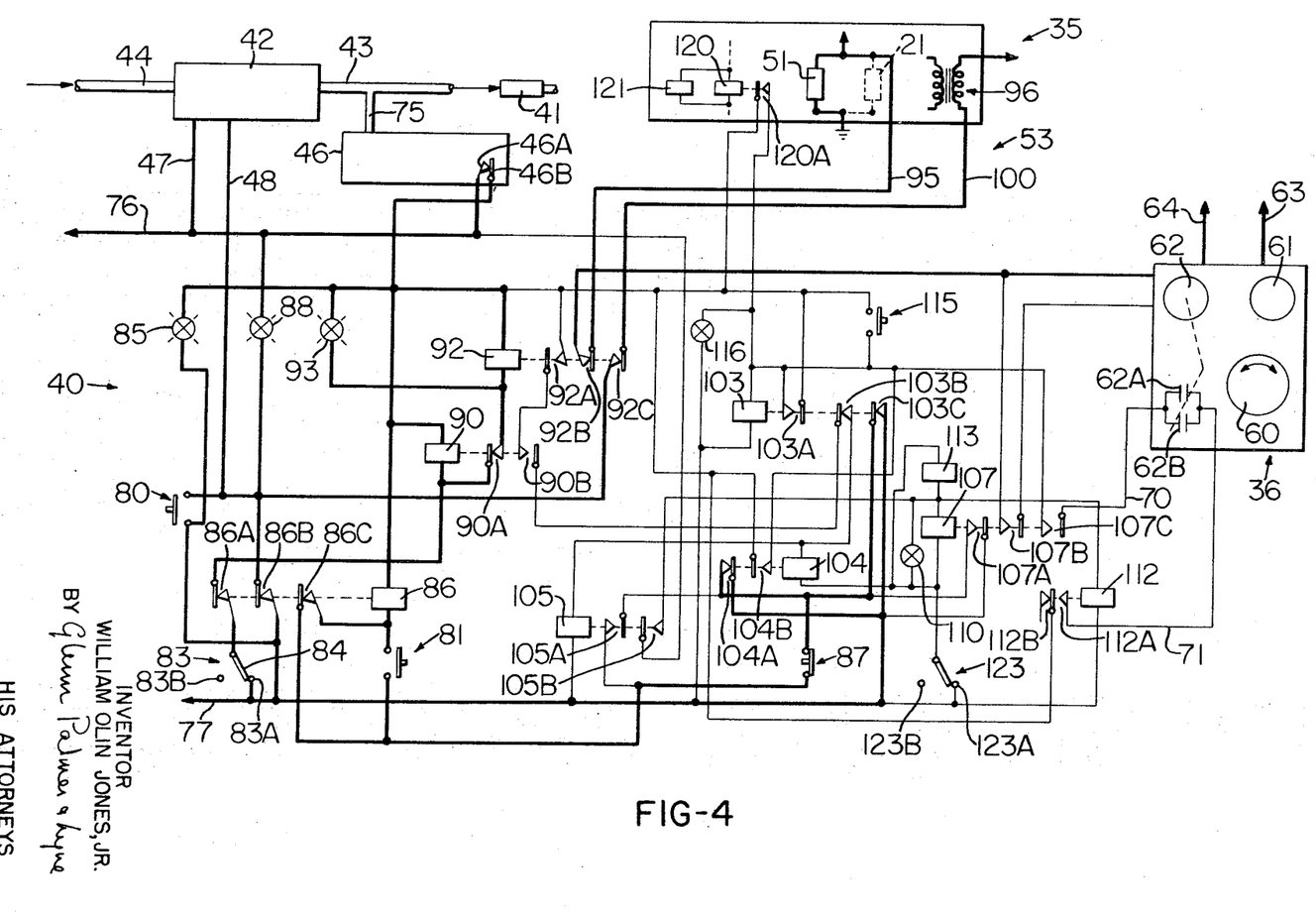
FIG. 4 is a view similar to FIG. 3 and particularly illustrating by bold lines the main effective parts of the electrical circuit of FIG. 3 during initial or first testing of a coil.

Having described the set-up circuit and the manner in which the programmer 40 is operated to make air adjustments in the system, the description will now proceed with a detailed description of the operation of the circuit during initial or first testing of a coil 21 and particular reference is made to FIG. 4, which shows the main active parts of the circuit in bold lines. During normal operation the movable arm 84 of switch 83 is moved against contact 83A, which is the position illustrated in FIG. 4. Also, it will be appreciated that a coil 21 to be tested and a standard coil 51 are placed on their respective mandrels 33 and 50 and suitably electrically connected in the comparison bridge 35.

During normal operation switches 80 and 81 are again actuated simultaneously, thereby energising relay 86 and causing the normally open contacts 86A, 86B, and 86C of such relay to close. The closed contact 86A energizes an adjustable timer 90 which may have its time adjusted between two seconds and two minutes. The timer 90 controls the time of initial or first testing and, in particular, the timer 90 controls the time that the comparison bridge 35 is in the circuit to initially test coil 21.

The timer 90 has a normally closed contact 90A and a normally open contact 90B. Current flows through normally closed contact 90A, which remains closed until the timer times out, and energizes a relay 92 while simultaneously lighting an indicator light 93. The relay 92 has a normally closed contact 92A and normally open contacts 92B and 92C and upon energizing the relay 92 its contact 92A is opened and its contacts 92B and 92C are simultaneously closed.

Upon opening contact 92A part of a safety circuit is created which prevents the blocking action (which is described in more detail subsequently) by assuring that there will be no current flow to contact 90B of the timer 90. The closing of contact 92B connects the test coil 21 on the fixture 32 to the impedance bridge 35 through a line 95. The closing of contact 92C energizes the supply transformer 96 in the impedance bridge 35 through a line 100.

Figure 5:
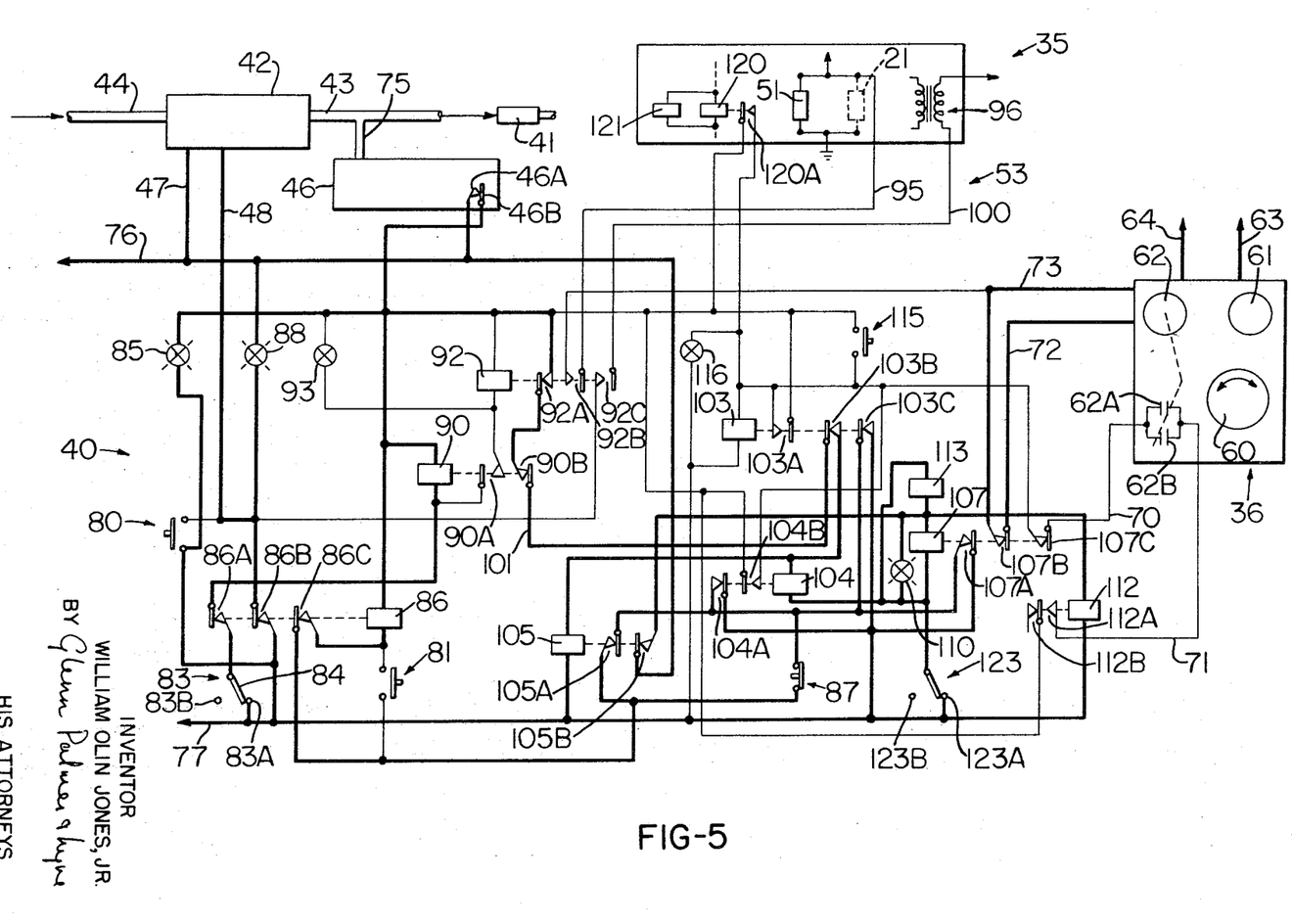
FIG. 5 is a view similar to FIG. 3 and particularly illustrating by bold lines the main effective parts of the electrical circuit during blocking of a coil found acceptable during the initial testing and also illustrating the provision of a second test substantially simultaneously with the blocking action to assure the coil being blocked is acceptable upon completion of the blocking action.

If the coil 21 being tested is within the predetermined tolerance the cycle will continue and the main active parts of the cycle may now be readily ascertained by referring particularly to the bold line presentation in FIG. 5 of the drawings.

Having determined by this initial test that a coil 21 is within acceptable limits, the timer 90 will time out and operate its contacts 90A and 90B so as to open contact 90A and close contact 90B. The opening of contact 90A deenergizes the relay 92 and also turns off the lamp 93. Deenergizing relay 92 causes its normally closed contact 92A to close and its normally open contacts 92B and 92C to open.

The closing of contact 92A allows current to pass through contact 90B, just closed, and through a line 101 to a normally closed contact 103B of a relay 103 to thereby energize another timer 104 operatively connected to the contact 103B. The closed contact 92A also energizes another relay 105 connected to contact 103B.

When contacts 92B and 92C are opened by deenergizing the relay 92, the comparison bridge 35 is automatically disconnected from the circuit and excitation is turned off the supply transformer 96 in the comparison bridge 35.

The relay 105 has normally open contacts 105A and 105B and once relay 105 is energized such normally open contacts are closed. The closing of contact 105A allows current to flow to normally closed contact 104A of the timer 104, to contact 103C of relay 103, which is also normally closed, and to a contact 107A of a relay 107 which at this point is normally open.

The contacts 105A and 103C are in parallel with switch 87. Therefore, with the contacts 105A and 103C closed, switch 87 cannot be actuated to release the coil 21 from its mandrel 32. This is a safety feature to prevent damage to the mandrel 33 when high current is on during the blocking action.

The closing of contact 105B energizes relay 107 and simultaneously lights a lamp 110. Closing contact 105B also starts another timer 112 and energizes a counter 113 indicating that the coil 21 which was found acceptable during the initial first test has now been blocked successfully and is an acceptable finished or blocked coil.

The relay 107 has normally open contacts 107A, 107B, and 107C which are closed upon energizing such relay. Contact 107A is in parallel with the switch 87 and once contact 107A is closed it will prevent release of the coil 21 during the blocking action. The contact 107B is connected in series with the high blocking current provided by the apparatus 36 by means of a line 72. Thus, when contact 107B closes it energizes the coil 21 and allows high current to flow through such coil to resistance heat and block the coil.

Contact 107C is also simultaneously closed upon energizing relay 107 and connects one side of an emergency stop switch 115 to the low and high contacts 62A and 62B of the ammeter 62 through the line 70.

The timer 104 is adjustable between two seconds and two minutes and the time setting on the timer 104 determines the length of time what a coil 21 is blocked, i.e., how long high current is used to resistance heat and block the coil. When the timer 104 times out its normally closed contact 104A opens, releasing part of the safety circuit to the test fixture 32 and its normally open contact 104B closes to energize the relay 103.

The relay 103 has a normally open contact 103A and normally closed contacts 103B and 103C. Upon energizing the relay 103 a lamp 116 is lit, contact 103A is closed, and contacts 103B and 103C are opened. Once contact 103B opens it deenergizes the relay 105 and the timer 104. The opening of contact 103C also release part of a safety circuit to the fixture 32. Further, when the contact 103C opens it also opens line 76 which feeds all circuits to the programmer 40.

When power is removed the air solenoid 42 is deenergized, which shuts off the pressurized air to the actuator 41 to thereby release the now blocked coil 21, and the programmer 40 automatically recycles so that it will be in condition to receive the next coil 21 to be tested and blocked. The operation of relay 103 is such that its transfers only momentarily and lamp 116 only flashes for such momentary period.

Thus, it can be seen from the above description that a coil 21 is first initially tested to determined acceptability thereof and the applicable portions of the energized circuit are shown by bold lines in FIG. 4. The initially acceptable coil is then automatically and sequentially blocked through the action of the programmer 40 passing a high current therethrough and the main parts of the circuit for blocking are indicated by the bold line showing of FIG. 5. Once the blocking is complete the programmer releases the locking means of the apparatus 20 and in particular deactuates the actuator 41 to release the blocked coil and enable removal thereof in any suitable manner as by manual means, for example.

In those applications of this invention where the blocked coil 21 is removed manually, it will be appreciated that the operator must wear protective gloves inasmuch as the resistance heating of the coil causes it to become very hot.

The preceding is a description of the operation of the various components under conditions where the coil 21 is acceptable during initial testing as well as being successfully blocked. The description will now continue under conditions where the coil 21 is not initially acceptable or becomes defective during blocking, and a second concurrent test provided during such blocking establishes its defective character.

If a coil is not within predetermined tolerance limits a relay 120 in the comparison bridge 35 is energized, causing its normally open contact 120A to close and energize relay 103, light lamp 116, and energize a reject counter 121.

Upon energizing relay 103 its normally closed contacts 103B are opened whereupon the cycle stops and the defective coil is held locked on the mandrel 33 of the fixture 32. In particular, it is seen that the programmer 40 holds the locking means (i.e., the actuating cylinder 41) in a locked position and requires separate external actuation of the programmer 40 to release the locking means and thereby enable removal of such defective or unacceptable coil from the test fixture 32.

The separate and external actuation which is required in this exemplary embodiment of the invention is achieved by external actuation of switch 87 in the programmer 40. Upon opening the switch 87 the solenoid valve 42 is deenergized, which deactuates the air cylinder 41.

If a coil is found acceptable during the initial test it is held in its locked position on the test fixture 32 and the apparatus of this invention enables the blocking action to continue by passing a high current through the coil and allowing such coil to be resistance heated and blocked. However, if during the process of blocking, the coil becomes defective due to breakdown as a result of the blocking action, or the like, then the programmer 40 again operates in an automatic manner so as to require separate external actuation to release the locking means and enable removal of the defective coil. Once again such separate external actuation of the programmer is achieved by actuating the switch 87.

The timer 112 is energized when the blocking relay 107 is energized. The timer 112 has a normally open contact 112A which is in series with the ammeter 62 in the high current circuit. As will be apparent from FIGS. 3 and 6 of the drawings, both the low ammeter contacts 62A and high ammeter contacts 62B are in series with the contact 112A of timer 112 and contact 107C of relay 107. The ammeter contact 107C is in parallel with the switch 115.

The timer 112 is an adjustable timer and is set to allow sufficient time for the high current to become established through the circuit and the high current must be such that it is within the range of the low and high set points as determined by contacts 62A and 62B respectively of the ammeter 62. If the high current, which causes resistance heating and hence blocking, goes above the high set point the contact 62B in the ammeter 62 closes and allows current to pass through the contacts 112A of timer 112 and contacts 107C of relay 107 to energize the relay 103 and thereby stop the cycle in the manner previously described. Similarly if the high current is below the low set point as determined by the low ammeter contacts 62A, the contacts 62A will close and will again energize the relay 103 through contacts 112A and 107C. Once again it is necessary to provide separate external actuation of the programmer 40 to release the locking means and hence deactuate the air solenoid valve 42 and actuator 41 and once again this is achieved by actuating the switch 87 in the programmer.

The cooperating action of the timer 112, ammeter 62 and associated electrical components provide, in effect, a second test of the initially acceptable coil 21 and this second test is provided substantially simultaneously with the blocking action.

In this detailed description the separate external actuation of the programmer 40 is referred to as being achieved by manual actuation of a switch 87; however, it will be appreciated that any suitable external actuation means may be provided to actuate switch 87 and may comprise part of a mechanized system. It will also be appreciated that each coil 21 may be placed on and removed from the fixture 32, either manually or by utilizing suitable automatic equipment.

In the course of using the apparatus 20 of this invention it may be desired to merely conduct testing of coils 21 utilizing the comparison bridge 35 and without allowing the circuit to continue the blocking action. For this purpose a switch 123 is provided in the programmer 40. The switch 123 has a contacter which is movable between a pair of fixed contacts 123A and 123B. During normal operation of the system where blocking is desired to be achieved the movable contacter of switch 123 is in contact with the contact 123A and in the manner illustrated in FIGS. 3–5 of the drawings. For initial testing only the movable contacter is moved into position against fixed contact 123B whereupon it will be seen that the circuit to the timer 104 and relay 107 is thereby opened and it is not possible to apply high blocking current to a coil 21.

As previously mentioned, the electrical device for determining the electrical characteristics of a particular coil presented in this exemplary embodiment of the invention is in the form of an electrical comparator and is shown as a comparison bridge 35. A detailed circuit for the comparison bridge 35 is illustrated in FIG. 7 of the drawings and it will be seen from FIG. 7 that a coil 21 to be tested is connected in position in the circuit and balanced against a standard coil 51 and as illustrated at 124.

The comparison bridge 35 energizes the coils 21 and 51 at 6 volts alternating current and the impedance difference is fed through the line 125 to a four-stage amplifier indicated at 126. A detailed presentation of the various component parts of the amplifier circuit and of the comparison bridge 35 in general will not be made inasmuch as the nature of such component parts and their functions will be readily apparent from the circuit presented in FIG. 7.

The amplified signal is fed to a metering circuit through a meter input line 131 and the impedance difference or deviation of the coil 21 being tested from the standard coil 51 is read directly on the scale of the deviation meter 120. The deviation meter may be calibrated in any suitable manner so as to provide full-scale ranges of 1%, 2%, 5%, 10%, and 25% deviation, for example.

The deviation meter 120 provides a visual indication to an operator of the apparatus 20 of whether the coil 21 being tested is acceptable; however, it will be appreciated that if a coil 21 is not acceptable during its first test a signal is provided through contact 120A of meter 120 to actuate relay 103, stop the programmer 40, and lock the unacceptable coil on the fixture 32 as described earlier. If the coil is acceptable the programmer 40 will allow the blocking action to continue. Although any suitable deviation meter, or the like, may be utilized in the apparatus 20 of this invention, one example of an acceptable meter which has been used successfully is meter model No. 1075 supplied by the Superior Electric Company of Bristol, Conn.

Having presented a detailed description of the apparatus and method of this invention, a brief general description will now be made to highlight the simplicity with which a coil 21 may be tested. In particular, a coil 21 is suitably placed on the test fixture 32 and connected with a standard coil 51. The apparatus 32 has locking means including an air operated actuator 41 which is utilized to lock the coil 21 in position. The testing and blocking sequence is achieved in a substantially automatic manner and is achieved by an operator pressing switches 80 and 81 of the programmer 40. Simultaneous actuation of the switches 80 and 81 is required and assures that the operator will have his hands occupied, for safety, during the commencement of the testing and blocking action.

Actuation of switches 80 and 81 of the programmer 40 causes the air cylinder 41 to lock the coil 21 in position upon the test fixture 32 whereupon an automatic cycle is commenced to test the coil 21 against the standard coil 51.

This first or initial test of the coil is achieved through the use of the comparison bridge 35 and FIG. 4 shows the active parts of the circuit for this test in bold lines.

If the coil 21 is found within acceptable limits the cycle continues causing high current to flow through the coil to resistance heat and block the coil and the appropriate active portions of the circuit are illustrated by bold lines in FIG. 5. Substantially simultaneously with the blocking action a second test is, in effect, being continuously conducted to assure the current flowing through the coil is within an acceptable range.

If during the blocking and simultaneous testing the coil 21 is found acceptable, the programmer 40 automatically releases the locking means, i.e., deactuates the air cylinder 41, whereupon the coil 21 can be removed from the test fixture 32 by an operator using asbestos gloves, for example. The programmer 40 is now in condition to test and block another coil.

If during the initial test the coil is found defective then the operation of the circuit is such that it is necessary to actuate the programmer using a separate and external means to enable release of the defective or unacceptable coil 21 and this is achieved in this example of the invention by actuating the switch 87 in the programmer. Similarly, if during the substantially simultaneous test of the coil 21 conducted during the blocking action, the coil is determined to be unacceptable; then, the coil is held locked on the test fixture 31 by the pneumatic actuator 41 and once again requires separate external operation of the switch 87 to release the defective coil.

This feature of keeping an unacceptable coil 21 locked on the test fixture 32 is provided to assure optimum operator safety and efficiency of operation. Also, it will be appreciated that positive operator action is required to continue the testing and blocking of coils 21.

Reference has been made throughout the specification and claims to the timers 90, 104, and 112; however, it will be apparent from the description presented in the specification that such timers are in essence time delay relays. Therefore, it is to be understood that the phrase time delay relay may be used interchangeably with the word timer at each location where it appears in this specification and claims.

In the above description reference has been made to the timer 90 used in initial testing and timer 104 used in blocking as being adjustable between two seconds and two minutes; however, in most applications of this invention the actual initial testing and blocking may each be easily achieved in roughly two seconds.

While present exemplary embodiments of this invention, and method of practicing the same, have been illustrated and described, it will be recognized that this invention may be otherwise variously embodied and practiced within the scope of the following claims.

What is claimed is:

1. An apparatus for testing and blocking an electrical coil comprising: a fixture for supporting said coil; said fixture having locking means for locking said coil in position; an electrical device for determining electrical characteristics of said coil; and an electrical programmer interconnected to said coil, electrical device, and locking means; said programmer initially actuating said locking means to lock said coil in position, then automatically and sequentially operatively connecting said coil to said electrical device to provide a first test of said coil, and then automatically operating to pass an electrical current through an initially acceptable coil to block said acceptable coil and substantially simultaneously with the blocking action provide a second test of the acceptable coil; said programmer automatically releasing said locking means upon successfully blocking a coil and in the event of a defective coil during at least one of said tests said programmer holding said locking means in a locked position and requiring separate external actuation of said programmer to release said locking means and enable removal of said defective coil.

2. An apparatus as set forth in claim 1 and further comprising a switch operatively connected to said programmer to enable said external actuation and release of said defective coil.

3. An apparatus as set forth in claim 1 in which said programmer comprises a signaling device for automatically signaling the presence of a defective coil, a first counter for counting the total number of defective coils processed by said apparatus, and a second counter for counting the total number of coils satisfactorily blocked on said apparatus.

4. An apparatus as set forth in claim 1 in which said electrical device comprises an electrical comparator for comparing said coil against a standard article of known electrical characteristics.

5. An apparatus as set forth in claim 1 in which said electrical device comprises an impedance bridge for comparing said coil against a standard coil.

6. An apparatus as set forth in claim 1 and further comprising means for varying the electrical power supplied to said apparatus for blocking purposes, said varying means being operatively connected to said programmer.

7. An apparatus as set forth in claim 1 in which said fixture comprises a radially expandable mandrel adapted to be received in an associated opening of each coil and said locking means comprises an actuator for radially expanding and holding said mandrel in its radially expanded position.

8. An apparatus as set forth in claim 1 in which said programmer has a time delay relay for automatically controlling the time interval of said first test.

9. An apparatus as set forth in claim 1 in which said programmer has a time delay relay for controlling the time interval of said blocking.

10. An apparatus as set forth in claim 1 wherein said electrical characteristic comprises the impedance of said coil, said electrical device comprises an impedance bridge for comparing the impedance of said coil against the impedance of a standard coil, said impedance bridge having an amplifier for amplifying the impedance difference between said coil and said standard coil, and in the event said amplified impedance difference is excessive it is fed to said electrical programmer to stop the automatic cycle of the programmer.

11. An apparatus as set forth in claim 10 in which said programmer has a first adjustable time delay relay for automatically controlling the time interval of said first test and a second adjustable time delay relay for controlling the time interval of said blocking.

12. An apparatus as set forth in claim 1 in which said second test is achieved by an ammeter having low current and high current set points defining an acceptable range therebetween and in the event the blocking current is out of said acceptable range said programmer is automatically stopped and requires said separate external actuation.

13. An apparatus as set forth in claim 12 in which each of said set points is defined by a pair of adjustable contacts and further comprising an adjustable time delay relay for assuring blocking current flow through said coil has been stabilized prior to conducting said second test to assure said programmer will only be stopped in the event of a defective coil.

14. A method of testing and blocking an electrical coil comprised of an elongated strip of electrically conductive material having a heat-sealable insulating material arranged between adjacent turns of said coil, said method comprising the steps of, supporting said coil on a fixture, locking said coil in position with locking means operatively associating with said fixture, initially testing said electrical coil, blocking said coil by passing a controlled current through each coil determined to be acceptable by said initial test to resistance heat said strip and cause said heat-sealable insulating material to be bonded against adjoining surfaces of said strip, concurrently testing said acceptable coil during said blocking step, automatically releasing said locking means upon successfully blocking a given coil, and automatically holding said locking means in a locked position in the event said coil is found defective during at least one of said testing steps to thereby require separate external actuation of said locking means to release a defective coil.

15. A method as set forth in claim 14 in which said step of initially testing said coil comprises the step of electrically balancing the impedance of said coil against the impedance of a standard coil in a comparison bridge.

16. A method as set forth in claim 14 in which said separate external actuation of said locking means to release a defective coil comprises actuation of a release switch which controls the action of said locking means.

17. A method as set forth in claim 14 in which said steps of initially testing and blocking a given coil are each controlled by an adjustable time delay relay to thereby automatically control total time and provide a method which enables testing and blocking in a minimum time.

18. A method as set forth in claim 14 and further comprising the steps of increasing the voltage on a coil found acceptable by initial testing to thereby increase current flow therethrough to a predetermined value to thereby resistance heat said coil in a rapid and efficient manner.

19. A method as set forth in claim 14 wherein said steps of initially testing, blocking, and concurrently testing said coil are controlled in an automatic and sequential manner by an electrical programmer.

20. A method as set forth in claim 14 in which said step of concurrently testing during said blocking step is achieved by measuring electrical current flow with an ammeter having low current and high current set points defining an acceptable range of current flow therebetween and in the event said current flow is out of said acceptable range said ammeter provides a control signal which automatically holds said locking means in a locked position.

21. A method as set forth in claim 20 and comprising the further step of delaying said measuring of electrical current flow with said ammeter to assure current flow used for blocking purposes has reached a stabilized level prior to measuring thereof.

References Cited

UNITED STATES PATENTS

| | | | |
|---|---|---|---|
| 1,595,838 | 8/1926 | Turner | 156—275 XR |
| 1,908,272 | 5/1933 | Sommer | 29—593 |

RUDOLPH V. ROLINEC, Primary Examiner

E. L. STOLARUN, Assistant Examiner

U.S. Cl. X.R.

29—593, 602; 156—275